No. 686,113. Patented Nov. 5, 1901.
J. C. McELROY.
WATER BASIN SUPPORT.
(Application filed Mar. 11, 1901.)

(No Model.)

WITNESSES:
Chas. H. Luther Jr.
Ada E. Hagerty.

INVENTOR:
John C. McElroy
by Joseph A. Miller & Co.
ATTORNEYS.

UNITED STATES PATENT OFFICE.

JOHN C. McELROY, OF PROVIDENCE, RHODE ISLAND.

WATER-BASIN SUPPORT.

SPECIFICATION forming part of Letters Patent No. 686,113, dated November 5, 1901.

Application filed March 11, 1901. Serial No. 50,681. (No model.)

*To all whom it may concern:*

Be it known that I, JOHN C. MCELROY, a citizen of the United States, residing at Providence, in the county of Providence and State of Rhode Island, have invented a new and useful Improvement in Water-Basin Supports, of which the following is a specification.

This invention has reference to means for securing the water-basins to marble, tile, slate, or other slabs in set basins.

The invention consists in the peculiar and novel construction of the supporting-frames and the combination with the nozzle connections whereby the basin is secured, as will be more fully set forth hereinafter.

To secure a water-basin to a slab as heretofore constructed, holes had to be made in the under sides of the slabs to secure bolts or other fastening devices to hold the basin firmly against the under surface of the slab. Marble, slate, tile, and other slabs are preferably made as thin as practicable to lower the cost. The material of the slabs is of a brittle nature, and bolts secured in countersunk holes are liable to break out. In most hand wash-basins the hot and cold water faucet supports extend through the slab.

The object of my invention is to utilize the stems or bases of the faucets to secure the basin to the slab.

Figure 1:
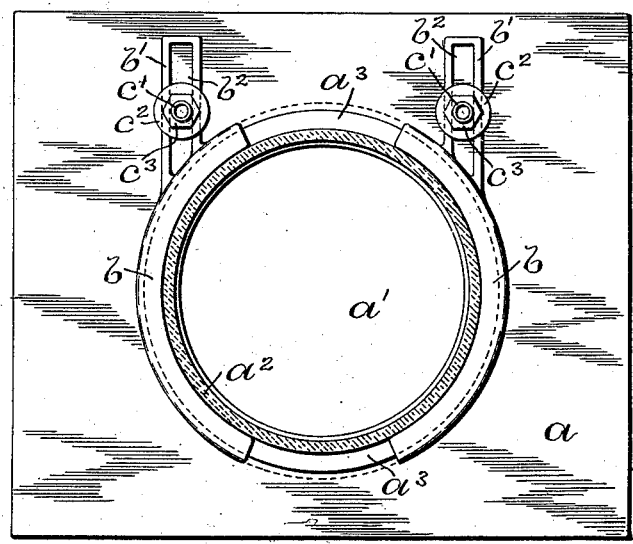
Figure 2:
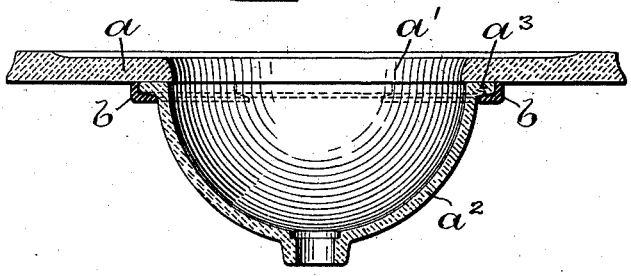
Figure 3:
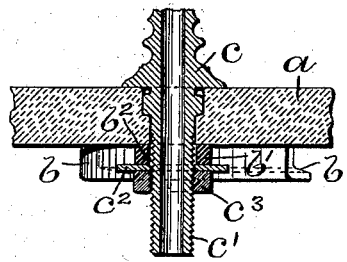

Figure 1 is a plan view of the under side of the slab, showing two brackets for supporting the basin. Fig. 2 is a vertical sectional view of a hand wash-basin secured to a slab, showing my invention. Fig. 3 is a sectional view, on an enlarged scale, showing the bracket secured by the base of the faucet.

In the drawings, $a$ indicates the slab, provided with the opening $a'$, $a^2$ the basin, and $a^3$ the usually radially-projecting flange on the upper edge of the basin; $b\ b$, two segmental flanged rims having each a bracket $b$, provided with the slot $b^2$. The rims $b\ b$ may form a complete ring, as is indicated in broken lines in Fig. 1, or half of a circle or somewhat less than half, as is shown in Fig. 1. They extend over and fit the flange $a^3$ on the basin. The brackets $b'$ are formed integral with the rims $b$ and extend to a considerable distance on the under side of the slab beyond the point where they are secured by means of the bases $c$ of the faucets, so as to form cantalivers bearing on the slab and rigidly supporting the basin. The bases $c$ of the faucets are tubular. They usually bear on the upper surface of the slab and have the tube $c'$ extending through the slab and are usually provided with a screw-thread.

In carrying out my invention I extend the screw-threaded tubes $c'$ of the bases $c\ c$ through the slots $b^2$, place washers $c^2$ on the tubes $c'$, and screw up the nut $c^3$ in screw-thread engagement with the tubes $c'\ c'$, so as to hold the brackets and the rims $b\ b$ in place, but permitting the same to swing. I now place the basin $a^2$ in the desired position under the slab, using the usual means to secure a tight joint, and swing the rims into close contact with the flange $a^3$ on the basin. I now tighten up the nut $c^3$ on each of the faucet-tubes, and thereby firmly secure the basin.

The rims $b$ and brackets $b'$ are made of several sizes to fit the usual basins of commerce. All the work and labor required is the securing of the brackets by a nut to the bases of the faucets and the making of the joint, work to which the plumbers are accustomed. The slabs are not weakened and the basin is more securely held.

Having thus described my invention, I claim as new and desire to secure by Letters Patent—

1. In a set basin, the combination with the slab, the basin and the bases of the faucets, of a flanged rim, slotted brackets on the rim extending beyond the bases of the faucets, and nuts in screw-thread engagement with the bases of the faucets, whereby the rim supporting the basin is secured to the slab by the faucets, as described.

2. In a set basin, the combination with the slab and the bowl, of a two-part flanged rim, a slotted cantaliver-bracket on each of the two parts of the flanged rim, the screw-threaded tubes of the faucets extending through the slotted brackets, and nuts in screw-thread engagement with the tubes of the faucets, as described.

3. In a set basin, the combination with the slab $a$ and the basin $a^2$ provided with the flange $a^3$, of the segmental flanged rims $b\ b$, the slotted cantaliver-brackets $b'\ b'$ integral with the rims, the screw-threaded tubes $c'$ of the faucet-bases, and the nut $c^3$, whereby the basin may be secured to the slab by means of the faucet-fixtures, as described.

In testimony whereof I have signed my name to this specification in the presence of two subscribing witnesses.

JOHN C. McELROY.

Witnesses:
J. A. MILLER, Jr.,
B. M. SIMMS.